A. & L. SMITH.
PROCESS OF REDUCING ANIMAL FATS.
No. 188,429. Patented March 13, 1877.
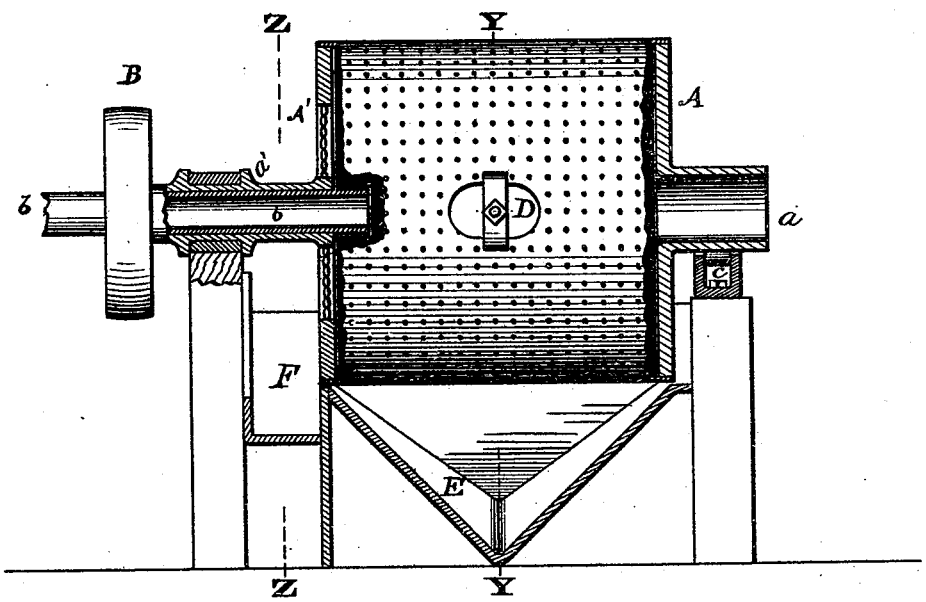
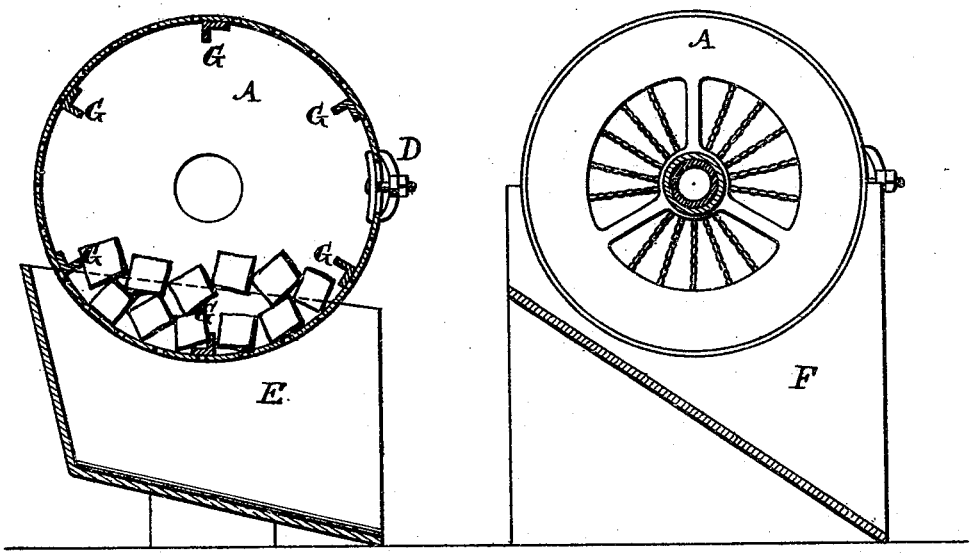
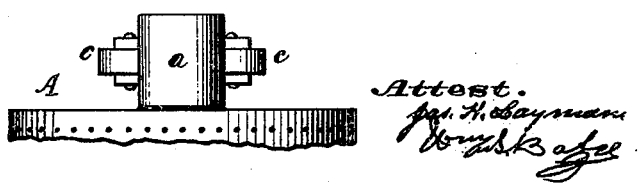

UNITED STATES PATENT OFFICE.

AMOR SMITH AND LEANDER SMITH, OF CINCINNATI, OHIO, ASSIGNORS TO AMOR SMITH & CO., OF SAME PLACE.

IMPROVEMENT IN PROCESSES OF REDUCING ANIMAL FATS.

Specification forming part of Letters Patent No. 188,429, dated March 13, 1877; application filed February 17, 1877.

*To all whom it may concern:*

Be it known that we, AMOR SMITH and LEANDER SMITH, of Cincinnati, in Hamilton county, Ohio, have invented a Process for Reducing Animal Fats, of which the following is a specification:

Our invention relates to the art of extracting oleine and stearine from animal fats, chiefly beef fat; and consists in a process of purifying and disintegrating the fat by the use of a peculiar machine, composed of a revolving perforated cylinder, into which the fat is introduced, and where it is mixed with water to purify it, and disintegrated by the revolution of the cylinder, and the action of hard bodies placed in the cylinder for that purpose.

Figure 1 is a side elevation of our machine, the journals and heads of the perforated cylinder being in section. Fig. 2 is a transverse section of the apparatus at the line Y Y of Fig. 1. Fig. 3 is a similar section at the line Z Z. Fig. 4 is a plan of one of the journals and its bearing of the perforated cylinder.

A A' is the perforated cylinder, supported at the end A' on a journal, a', of the ordinary construction, and fitted with a pulley, B, for revolving the cylinder. The journal a' is hollow, and a water-pipe, b, extends through it and conveys water to the interior of the cylinder. The end A of the cylinder is supported on a hollow trunnion, a, which, owing to its size, has its bearing on friction-wheels c c, Fig. 4. The fat is introduced into the cylinder through the hollow of the trunnion a.

As seen in Figs. 1 and 3, the end A of the cylinder is somewhat open, and has chains stretched radially across the openings. This opening permits the gristle and larger lumps to pass out of the cylinder, and also prevents overcharging of the cylinder. The refuse can, however, be removed through the man-hole D, and the end of the cylinder be made solid.

E is a hopper beneath the cylinder, to convey the water and disintegrated fat which flows from the cylinder to proper receptacles. F is a hopper, which performs the same service for the materials which pass out at the end A'.

In the machine which we have used we have found a cylinder six feet long by six feet diameter, and with perforations one quarter inch in diameter, to be a very convenient size, though these dimensions are not material. G G, &c., are ledges on the inside of the cylinder, which serve to more thoroughly stir up the contents by carrying them partly around as the cylinder revolves, and allowing them to drop down to the lower part of the cylinder again. These ledges also cause the blocks to be thrown around with more force by the revolution of the cylinder, and thereby renders them more effective in their action on the fat.

The cylinder is filled to about one-sixth its diameter, more or less, according to the pleasure of the operator, with blocks of wood or other hard material of suitable size. We have found six inches cube to be a very good size. The cylinder is then revolved at a speed of, say, from twenty to forty revolutions per minute.

The fat, in the condition in which it comes from the butcher, is thrown in through the trunnion a, and at the same time a stream of water is forced in through b. The water serves to take up in solution any blood or other impurities that may adhere to the fat, and also facilitates the process of disintegration. It may be introduced at a if desired, but it is preferable to introduce it through b', not only because it is more convenient, but also because it is thus thrown with some force against the fat entering at the opposite end of the cylinder, and its effect thereby increased.

By the revolution of the cylinder, and the consequent pounding of the blocks and the assistance of the water, the fat is thoroughly disintegrated and cleansed, and forced through the perforations of the cylinder and conveyed by the hopper E to proper receptacles, to be afterward further treated.

If it be desired to effect the cleansing and disintegration of the fat and the separation of the membrane therefrom at one operation, the water is used warm at a temperature of about 125° Fahrenheit.

We claim—

The described process of reducing animal fats, which consists in subjecting the same to a continuous pounding or disintegrating action, as set forth, whereby the contained oil globules are thoroughly broken up, water at the same time being admitted to the material under treatment to purify and assist disintegration, as herein described.

AMOR SMITH.
LEANDER SMITH.

Witnesses:
JEREMIAH F. TWOHIG,
WM. M. S. BATES.